(12) United States Patent
Zewail et al.

(10) Patent No.: US 11,751,150 B2
(45) Date of Patent: Sep. 5, 2023

(54) SYNCHRONIZATION SIGNAL BLOCK INDEXING SCHEMES

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Jing Sun, San Diego, CA (US); Srinivas Yerramalli, Hyderabad (IN); Zhifei Fan, San Diego, CA (US); Wooseok Nam, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/153,474

(22) Filed: Jan. 20, 2021

(65) Prior Publication Data

US 2021/0258896 A1    Aug. 19, 2021

Related U.S. Application Data

(60) Provisional application No. 62/978,656, filed on Feb. 19, 2020.

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01)

(58) Field of Classification Search
CPC ........................... H04W 56/001; H04L 5/0048
See application file for complete search history.

(56) References Cited

U.S. PATENT DOCUMENTS

| | | | |
|---|---|---|---|
| 2018/0324678 A1* | 11/2018 | Chen | H04W 48/16 |
| 2019/0037481 A1* | 1/2019 | Zhang | H04L 5/0032 |
| 2019/0069256 A1* | 2/2019 | Jung | H04W 56/0015 |
| 2019/0081721 A1 | 3/2019 | Ly et al. | |
| 2019/0150110 A1* | 5/2019 | Ko | H04W 72/30 |
| | | | 370/350 |
| 2019/0319748 A1* | 10/2019 | Nam | H04W 72/1242 |
| 2020/0137596 A1* | 4/2020 | Oh | H04W 56/001 |

(Continued)

OTHER PUBLICATIONS

International Search Report and Written Opinion—PCT/US2021/014383—ISA/EPO—dated May 4, 2021.

(Continued)

*Primary Examiner* — Yee F Lam
(74) *Attorney, Agent, or Firm* — Harrity & Harrity LLP

(57) ABSTRACT

Various aspects of the present disclosure generally relate to wireless communication. In some aspects, a user equipment (UE) may detect a synchronization signal block (SSB) within a discovery reference signal (DRS) transmission window that includes more than 64 candidate SSB positions; determine an index value of the SSB based at least in part on an indexing scheme for SSBs that are included in the DRS transmission window, wherein the indexing scheme includes one of a consecutive indexing scheme or a non-consecutive indexing scheme; and determine a cell timing based at least in part on the index value. Numerous other aspects are described.

30 Claims, 13 Drawing Sheets

(56) References Cited

U.S. PATENT DOCUMENTS

| | | | | |
|---|---|---|---|---|
| 2020/0280940 A1* | 9/2020 | Kim | ............... | H04W 56/001 |
| 2020/0374703 A1* | 11/2020 | Jo | ............... | H04W 16/14 |
| 2020/0374837 A1* | 11/2020 | Harada | ............... | H04L 5/0094 |
| 2020/0404601 A1* | 12/2020 | Lin | ............... | H04W 56/001 |
| 2021/0136800 A1* | 5/2021 | Li | ............... | H04W 72/005 |
| 2021/0258901 A1* | 8/2021 | He | ............... | H04W 72/23 |

OTHER PUBLICATIONS

Motorola Mobility, et al., "Initial Access Procedure for NR-U", 3GPP Draft, 3GPP TSG RAN WG1#96, R1-1902963, 3rd Generation Partnership Project (3GPP), Mobile Competence Centre, 650, Route Des Lucioles, F-06921, Sophia-Antipolis, Cedex, France, vol. RAN WG1, No. Athens, Greece, Feb. 25, 2019-Mar. 1, 2019, Feb. 15, 2019 (Feb. 15, 2019), XP051600660, 5 pages, Retrieved from the Internet: URL:http://www.3gpp.org/ftp/tsg%5Fran/WG1%5FRL1/TSGR1%5F96/Docs/R1%2D1902963%2Ezip [retrieved on Feb. 15, 2019], p. 1, paragraph Section 2.1—p. 3.

* cited by examiner

SYNCHRONIZATION SIGNAL BLOCK INDEXING SCHEMES

CROSS-REFERENCE TO RELATED APPLICATION

This Patent Application claims priority to U.S. Provisional Patent Application No. 62/978,656, filed on Feb. 19, 2020, entitled "SYNCHRONIZATION SIGNAL BLOCK INDEXING SCHEMES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronization signal block indexing schemes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting a synchronization signal block (SSB) within a discovery reference signal (DRS) transmission window that includes more than 64 candidate SSB positions; determining an index value of the SSB based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and determining a cell timing based at least in part on the index value.

In some aspects, a method of wireless communication, performed by a base station, may include determining an index value of an SSB, included in a DRS transmission window that includes more than 64 candidate SSB positions, based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and transmitting the SSB and an indication of the index value in a candidate SSB position of the DRS transmission window.

In some aspects, a UE for wireless communication may include a memory and one or more processors operatively coupled to the memory. The memory and the one or more processors may be configured to detect an SSB within a DRS transmission window that includes more than 64 candidate SSB positions; determine an index value of the SSB based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and determine a cell timing based at least in part on the index value.

In some aspects, a base station for wireless communication may include a memory and one or more processors operatively coupled to the memory. The memory and the one or more processors may be configured to determine an index value of an SSB, included in a DRS transmission window that includes more than 64 candidate SSB positions, based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and transmit the SSB and an indication of the index value in a candidate SSB position of the DRS transmission window.

In some aspects, a non-transitory computer-readable medium may store one or more instructions for wireless communication. The one or more instructions, when executed by one or more processors of a UE, may cause the one or more processors to detect an SSB within a DRS transmission window that includes more than 64 candidate SSB positions; determine an index value of the SSB based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and determine a cell timing based at least in part on the index value.

In some aspects, a non-transitory computer-readable medium may store one or more instructions for wireless communication. The one or more instructions, when executed by one or more processors of a base station, may cause the one or more processors to determine an index value of an SSB, included in a DRS transmission window that includes more than 64 candidate SSB positions, based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and transmit the SSB and an indication of the index value in a candidate SSB position of the DRS transmission window.

In some aspects, an apparatus for wireless communication may include means for detecting an SSB within a DRS transmission window that includes more than 64 candidate SSB positions; means for determining an index value of the SSB based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and means for determining a cell timing based at least in part on the index value.

In some aspects, an apparatus for wireless communication may include means for determining an index value of an SSB, included in a DRS transmission window that includes more than 64 candidate SSB positions, based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and means for transmitting the SSB and an indication of the index value in a candidate SSB position of the DRS transmission window.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings or the same drawing may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
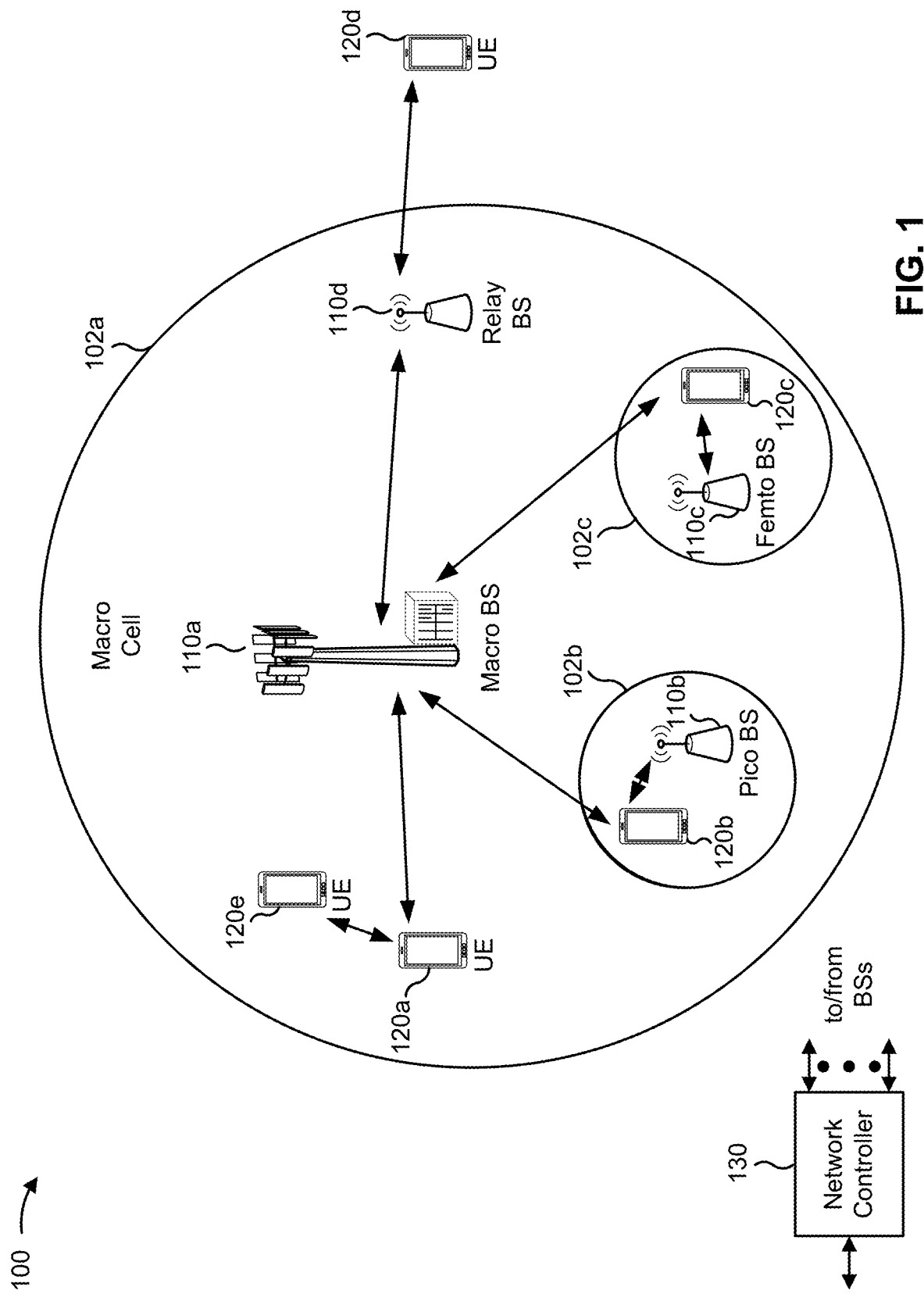
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
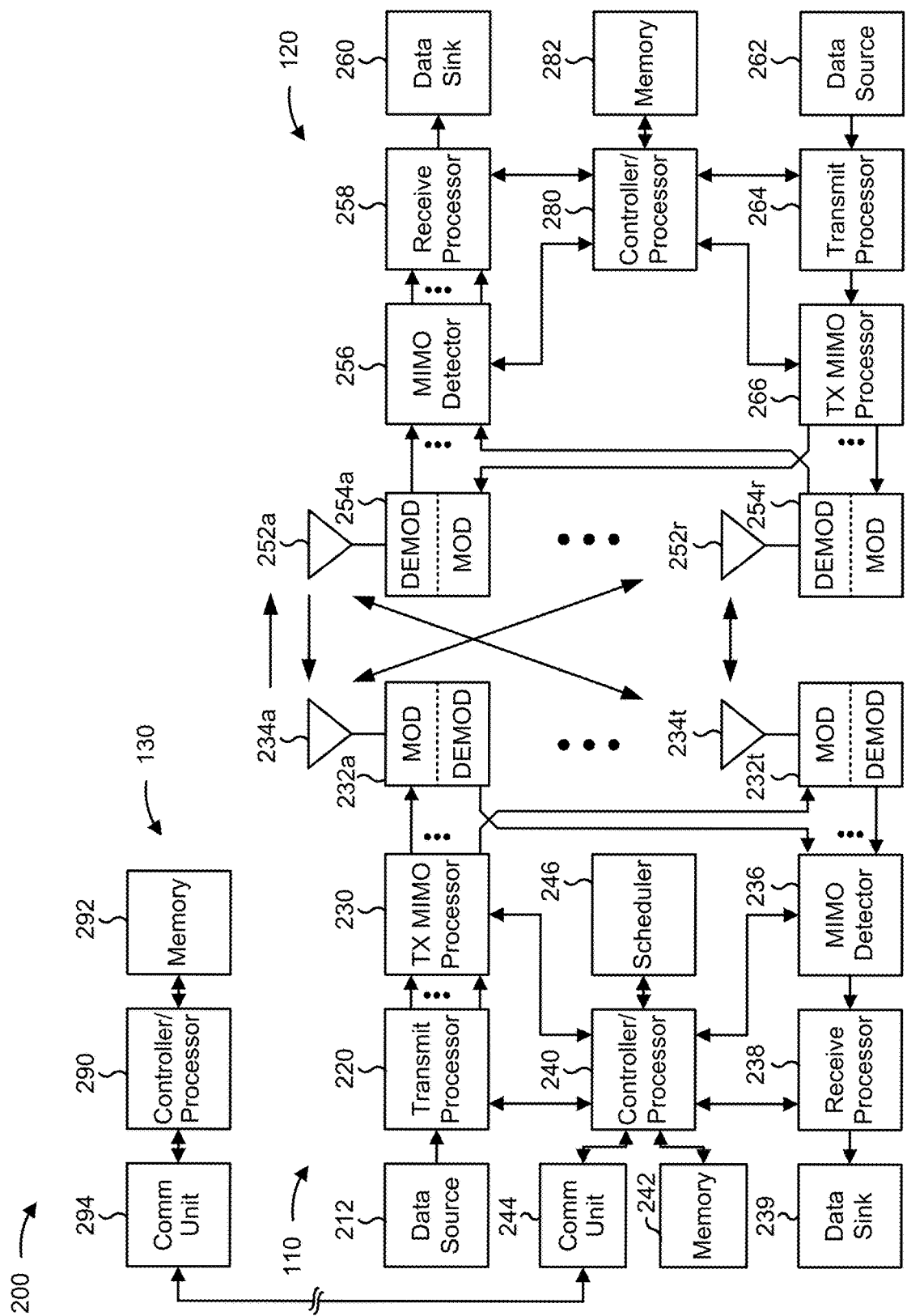
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP. RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronization signal block indexing schemes, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1200 of FIG. 12, process 1300 of FIG. 13, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for detecting a synchronization signal block (SSB) within a discovery reference signal (DRS) transmission window that includes more than 64 candidate SSB positions; means for determining an index value of the SSB based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; means for determining a cell timing based at least in part on the index value; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining an index value of an SSB, included in a DRS transmission window that includes more than 64 candidate SSB positions, based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; means for transmitting the SSB and an indication of the index value in a candidate SSB position of the DRS transmission window; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230. MOD 232, antenna 234, and/or the like.

As indicated above, FIG. 2 is provided as an example. Other examples may differ from what is described with regard to FIG. 2.

Figure 3:
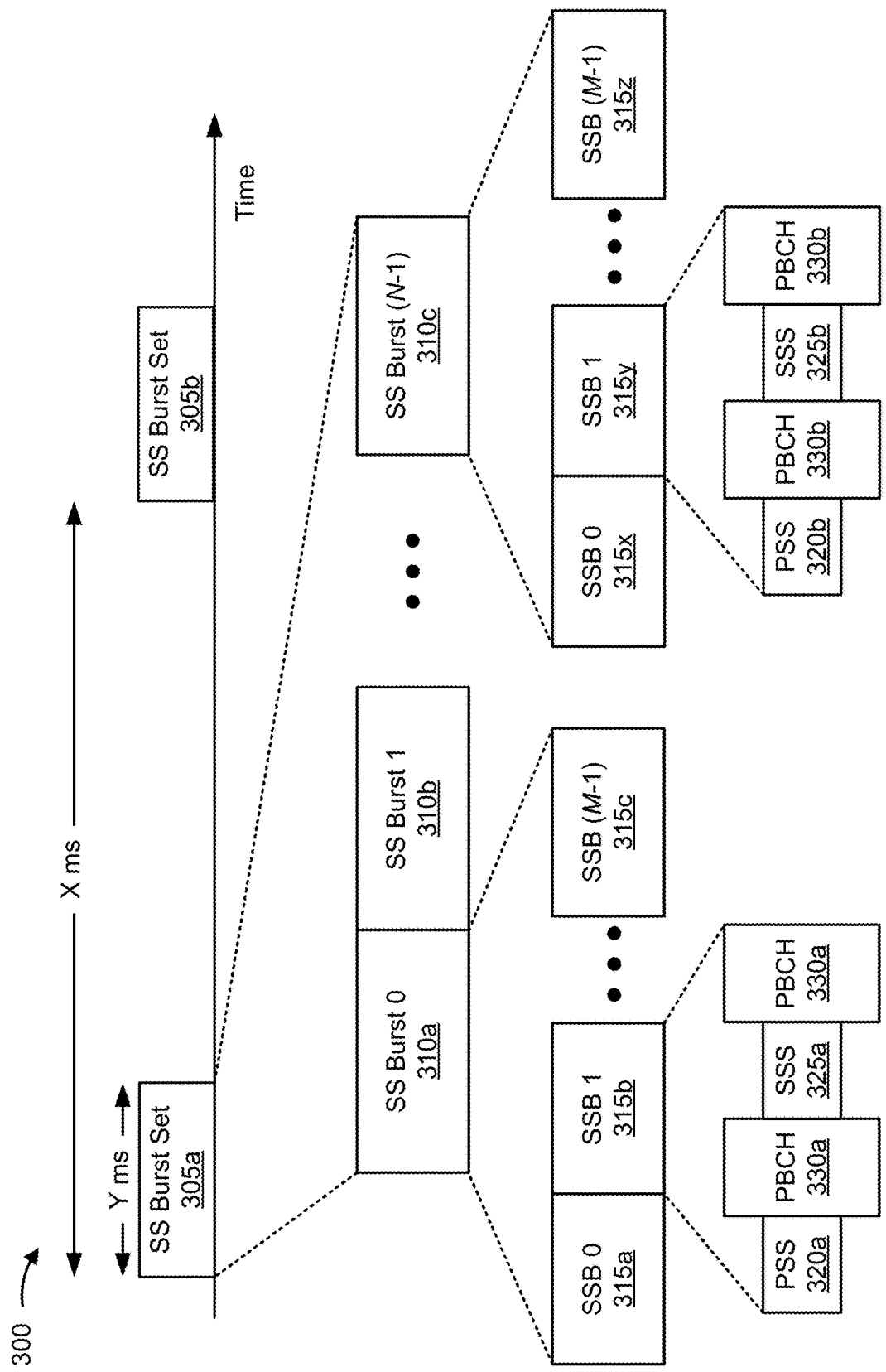
FIG. 3 is a diagram illustrating an example of a synchronization signal (SS) hierarchy, in accordance with various aspects of the present disclosure.

FIG. 3 is a diagram illustrating an example 300 of a synchronization signal (SS) hierarchy, in accordance with various aspects of the present disclosure. As shown in FIG. 3, the SS hierarchy may include an SS burst set 305 (e.g., SS burst set 305a, 305b, etc.), which may include multiple SS bursts 310 (e.g., SS burst 310a, 310b, 310c, etc.), shown as SS burst 0 through SS burst N-1, where N is a maximum number of repetitions of the SS burst 310 that may be transmitted by the base station. As further shown, each SS burst 310 may include one or more SS blocks (SSBs) 315 (e.g., SSBs 315a, 315b, 315c, 315x, 315y, 315z, etc.), shown as SSB 0 through SSB M-1, where M is a maximum number of SSBs 315 that can be carried by an SS burst 310. In some aspects, different SSBs 315 may be beam-formed differently (e.g., transmitted using different beams), and may be used for beam management, beam selection, and/or the like (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window, an SSB measurement time configuration (SMTC) window, and/or the like.

In some aspects, an SSB 315 may include resources that carry a primary synchronization signal (PSS) 320 (e.g., PSS 320a, 320b, etc.), a secondary synchronization signal (SSS) 325 (e.g., SSS 325a, 325b, etc.), a physical broadcast channel (PBCH) 330 (e.g., PBCH 330a, 330b, etc.), and/or the like. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure. Based at least in part on the monitoring and/or measuring, the UE 120 may indicate one or more SSBs 315 with a best signal parameter (e.g., a reference signal received power (RSRP) parameter and/or the like) to a base station 110. The base station 110 and the UE 120 may use the one or more indicated SSBs 315 to select one or more beams to be used for communication between the base station 110 and the UE 120 (e.g., for a random access channel (RACH) procedure and/or the like). Additionally, or alternatively, the UE 120 may use the SSB 315 and/or the SSB index to determine a cell timing for a cell via which the SSB 315 is received (e.g., a serving cell), as described in more detail below.

As indicated above, FIG. 3 is provided as an example. Other examples may differ from what is described with regard to FIG. 3.

Figure 4:
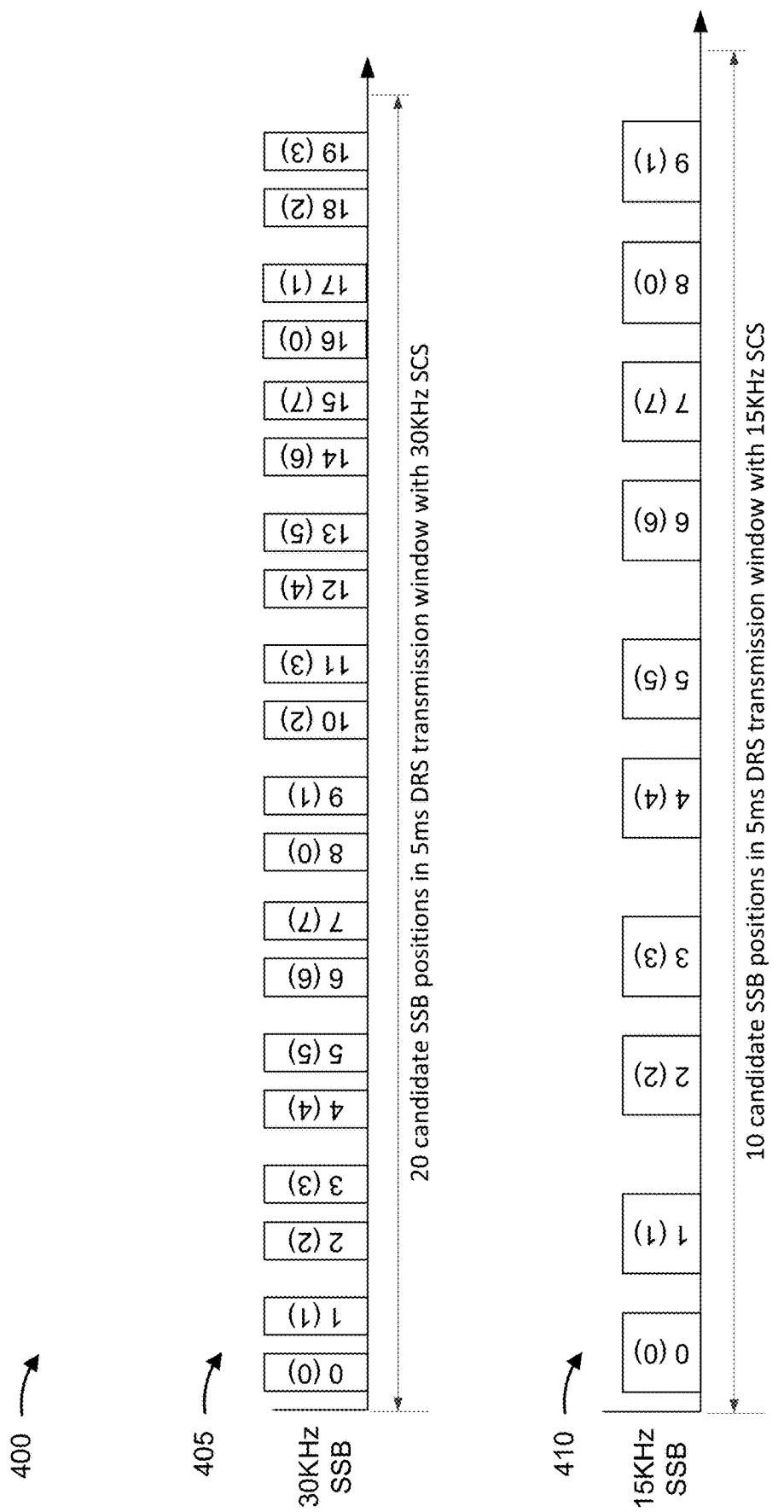
FIG. 4 is a diagram illustrating an example of candidate synchronization signal block (SSB) positions in an unlicensed radio frequency spectrum band, in accordance with various aspects of the present disclosure.

FIG. 4 is a diagram illustrating an example 400 of candidate SSB positions in an unlicensed radio frequency spectrum band, in accordance with various aspects of the present disclosure. An unlicensed radio frequency spectrum band may be referred to herein as an unlicensed band, and may include a band that is reserved for shared or unlicensed use, a band that is reserved for licensed use but that is operating in an unlicensed operating mode, and/or the like.

As an example, the unlicensed band may include one or more radio frequencies (e.g., one or more radio frequency spectrum bands) included in the radio spectrum (e.g., the portion of the electromagnetic spectrum corresponding to radio frequencies, or frequencies lower than approximately 300 gigahertz (GHz)). In some aspects, the unlicensed band may include one or more bands that are open for shared use by any device that complies with regulatory agency rules (e.g., associated with a particular country) for communicating via the one or more bands. For example, the unlicensed band may include one or more radio frequencies between approximately 5 GHz and approximately 6 GHz. As a more specific example, the unlicensed band may include one or more radio frequencies between approximately 5.15 GHz and approximately 5.825 GHz.

As another example, the unlicensed band may include one or more bands defined by the United States Federal Communications Commission (FCC) as the Unlicensed National Information Infrastructure (U-NII) radio band. The U-NII radio band may include, for example, a first band between approximately 5.15 GHz and approximately 5.25 GHz (e.g., the U-Nil Low band), a second band between approximately 5.25 GHz and approximately 5.35 GHz (e.g., the U-NII Mid band), a third band between approximately 5.47 GHz and approximately 5.725 GHz (e.g., the U-NII Worldwide band), and/or a fourth band between approximately 5.725 GHz and approximately 5.825 GHz (e.g., the U-Nil Upper band).

Devices that operate in an unlicensed band (e.g., UEs 120, base stations 110, and/or the like) may contend for access to the unlicensed band prior to gaining access to and/or communicating over the unlicensed band, such as by performing a listen before talk (LBT) procedure. An LBT procedure may include performing a clear channel assessment (CCA) procedure to determine whether a channel of the unlicensed band is available. When a device determines that the channel of the unlicensed band is not available (e.g., because another apparatus is already using the channel), a CCA procedure may be performed for the channel again at a later time. The CCA procedure may include detecting an energy level on the channel of the unlicensed band and determining whether the energy level satisfies a threshold. When the energy level does not satisfy (e.g., is less than, or is less than or equal to) the threshold, the CCA procedure is successful and contention to access the channel of the unlicensed band may be successful. When the energy level satisfies (e.g., is greater than, or is greater than or equal to) the threshold, the CCA procedure is unsuccessful and contention to access the channel of the unlicensed band may be unsuccessful. When the CCA procedure is successful, the device may transmit over the channel of the unlicensed band.

Because channel access is not guaranteed in an unlicensed band, a greater number of candidate SSB positions may be used in an unlicensed band as compared to a licensed band. For example, a DRS transmission window in a licensed band may include 8 candidate SSB positions. A candidate SSB position is a position (e.g., in the time domain) in which an SSB may be (e.g., is permitted or allowed to be) transmitted (regardless of whether an SSB is actually transmission in that position).

As shown by reference number 405, in an unlicensed band with a sub-carrier spacing (SCS) of 30 kilohertz (kHz), there may be 20 candidate SSB positions in a 5 millisecond DRS transmission window, as compared to 8 candidate SSB positions in a licensed band with an SCS of 30 kHz. In the unlicensed band, SSBs may have 8 possible SSB index values (e.g., from 0 to 7, shown in parenthesis, and each of which may represent a different quasi co-location characteristics for a corresponding SSB), and those index values may be repeated one or more times in different SSB candidate positions in the DRS transmission window. As shown, candidate SSB positions 0 through 7 may carry SSBs having index values of 0 through 7, respectively; candidate SSB positions 8 through 15 may carry SSBs having index values of 0 through 7, respectively; and candidate SSB positions 16 through 19 may carry SSBs having index values of 0 through 3, respectively. In this way, a number of opportunities for SSB transmission in a DRS transmission window is increased for an unlicensed band to mitigate the lower reliability of the unlicensed band (due to shared channel characteristics, contention for access, and/or the like) as compared to a licensed band.

As shown by reference number 410, in an unlicensed band with an SCS of 15 kHz, there may be 10 candidate SSB positions in a 5 millisecond DRS transmission window, as compared to 8 candidate SSB positions in a licensed band with an SCS of 30 kHz. In the unlicensed band, SSBs may have 8 possible SSB index values (e.g., from 0 to 7, shown in parenthesis), and a portion of those index values may be repeated in different SSB candidate positions in the DRS transmission window. As shown, candidate SSB positions 0 through 7 may carry SSBs having index values of 0 through 7, respectively; and candidate SSB positions 8 and 9 may carry SSBs having index values of 0 and 1, respectively. In this way, a number of opportunities for SSB transmission in a DRS transmission window is increased for an unlicensed band to mitigate the lower reliability of the unlicensed band (due to shared channel characteristics, contention for access, and/or the like) as compared to a licensed band.

In example 400, the DRS transmission window has a duration of 5 milliseconds, which may be the maximum DRS transmission window duration. In some aspects, the DRS transmission window may have a duration of 0.5 milliseconds, 1 millisecond, 2 milliseconds, 3 milliseconds, 4 milliseconds, or 5 milliseconds, among other examples. In some aspects, a UE 120 may assume a DRS transmission window duration of 5 milliseconds unless the UE 120 receives an indication otherwise. In example 400, the maximum number of candidate SSB positions within a DRS transmission window is 10 for a 15 kHz SCS, and is 20 for a 30 kHz SCS.

For an SCS of 15 kHz or 30 kHz, the 8 candidate SSB positions for a licensed band do not occupy the entire DRS transmission window, which leaves room for additional candidate SSB positions for an unlicensed band (e.g., up to 12 additional candidate SSB positions for an SCS of 30 kHz and up to 2 additional candidate SSB positions for an SCS of 15 kHz). For an SCS of 120 kHz (described in more detail below in connection with FIG. 5), 64 candidate SSB positions may be used in a licensed band and may occupy the entire DRS transmission window, which does not leave room for additional candidate SSB positions for an unlicensed band according to existing candidate SSB patterns. For an SCS of 240 kHz (described in more detail below in connection with FIG. 6), 64 candidate SSB positions may be used in a licensed band and may occupy half of the DRS transmission window. Some techniques and apparatuses described herein permit additional candidate SSB positions to be added for a 120 kHz or 240 kHz unlicensed band by introducing a new design or pattern for SSB candidate positions. Furthermore, some techniques and apparatuses described herein introduce various indexing schemes for indexing (e.g., assigning an SSB index to) the additional candidate SSB positions.

As indicated above, FIG. 4 is provided as an example. Other examples may differ from what is described with regard to FIG. 4.

Figure 5:
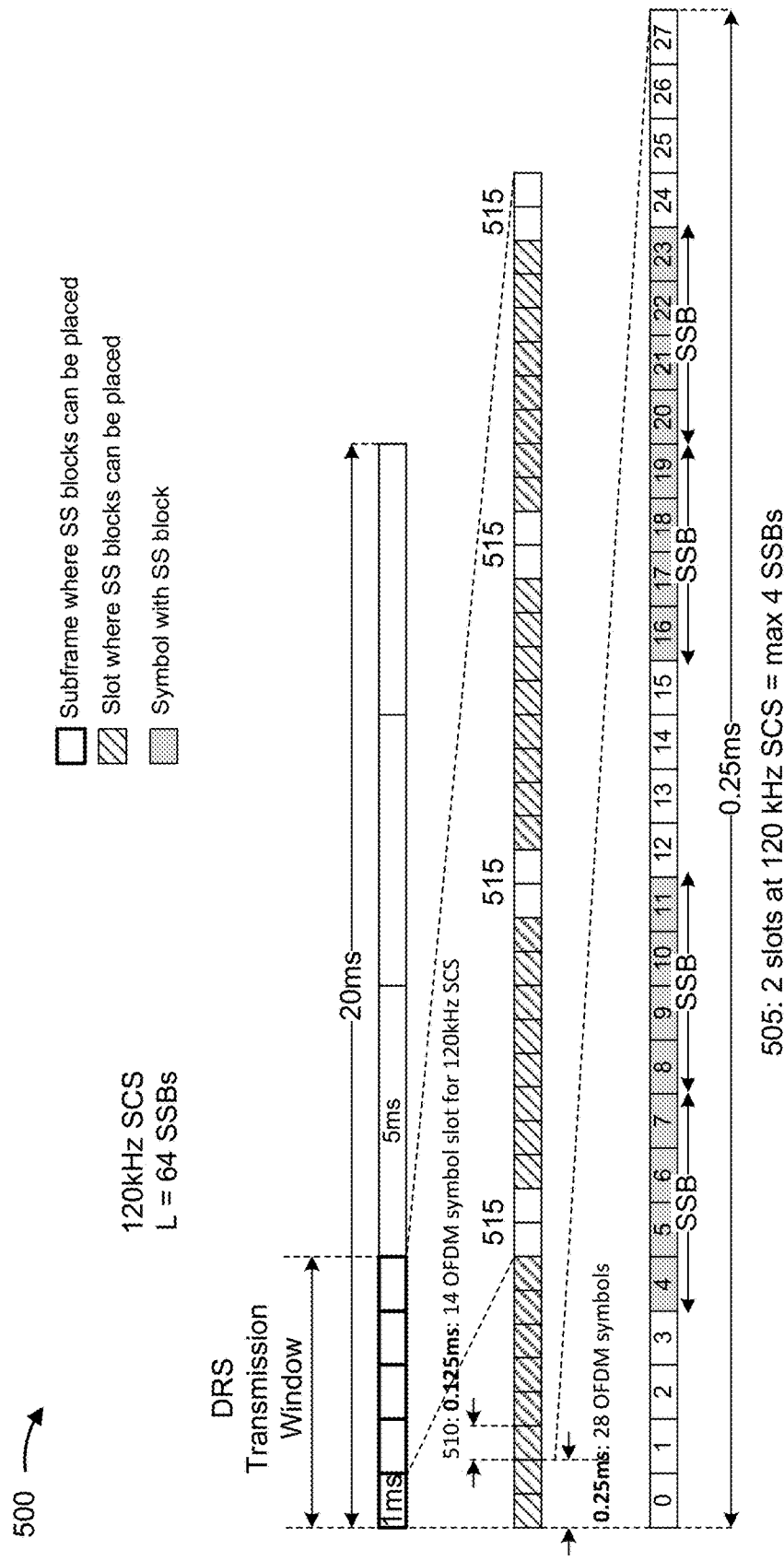
FIG. 5 is a diagram illustrating an example of SSB positions in a licensed radio frequency spectrum band with a 120 kHz sub-carrier spacing, in accordance with various aspects of the present disclosure.

FIG. 5 is a diagram illustrating an example 500 of SSB positions in a licensed radio frequency spectrum band with a 120 kHz sub-carrier spacing, in accordance with various aspects of the present disclosure.

As shown by reference number 505, in a configuration that includes 14 orthogonal frequency division multiplexing (OFDM) symbols per slot for an SCS of 120 kHz on a licensed band, a maximum of 4 SSBs may be transmitted across two consecutive slots. As shown by reference number 510, a slot may have a duration of 0.125 milliseconds for an SCS of 120 kHz. As shown by reference number 515, a DRS transmission window having a duration of 5 milliseconds on a band with an SCS of 120 kHz may be configured with a two slot gap (e.g., having a length of 0.25 milliseconds) after every 8 slots (e.g., 1 millisecond) that include SSBs, for a total of four gaps (covering 8 slots). Thus, the DRS transmission window may include a maximum of 64 SSBs.

As indicated above, this configuration does not leave room for additional candidate SSB positions for an unlicensed band according to existing SSB patterns, such as the pattern shown in FIG. 5. Some techniques and apparatuses described herein permit additional candidate SSB positions to be added for a 120 kHz unlicensed band by introducing a new design or pattern for SSB candidate positions. Furthermore, some techniques and apparatuses described herein introduce various indexing schemes for indexing (e.g., assigning an SSB index to) the additional candidate SSB positions, and for processing SSBs based at least in part on an indexing scheme.

As indicated above, FIG. 5 is provided as an example. Other examples may differ from what is described with regard to FIG. 5.

Figure 6:
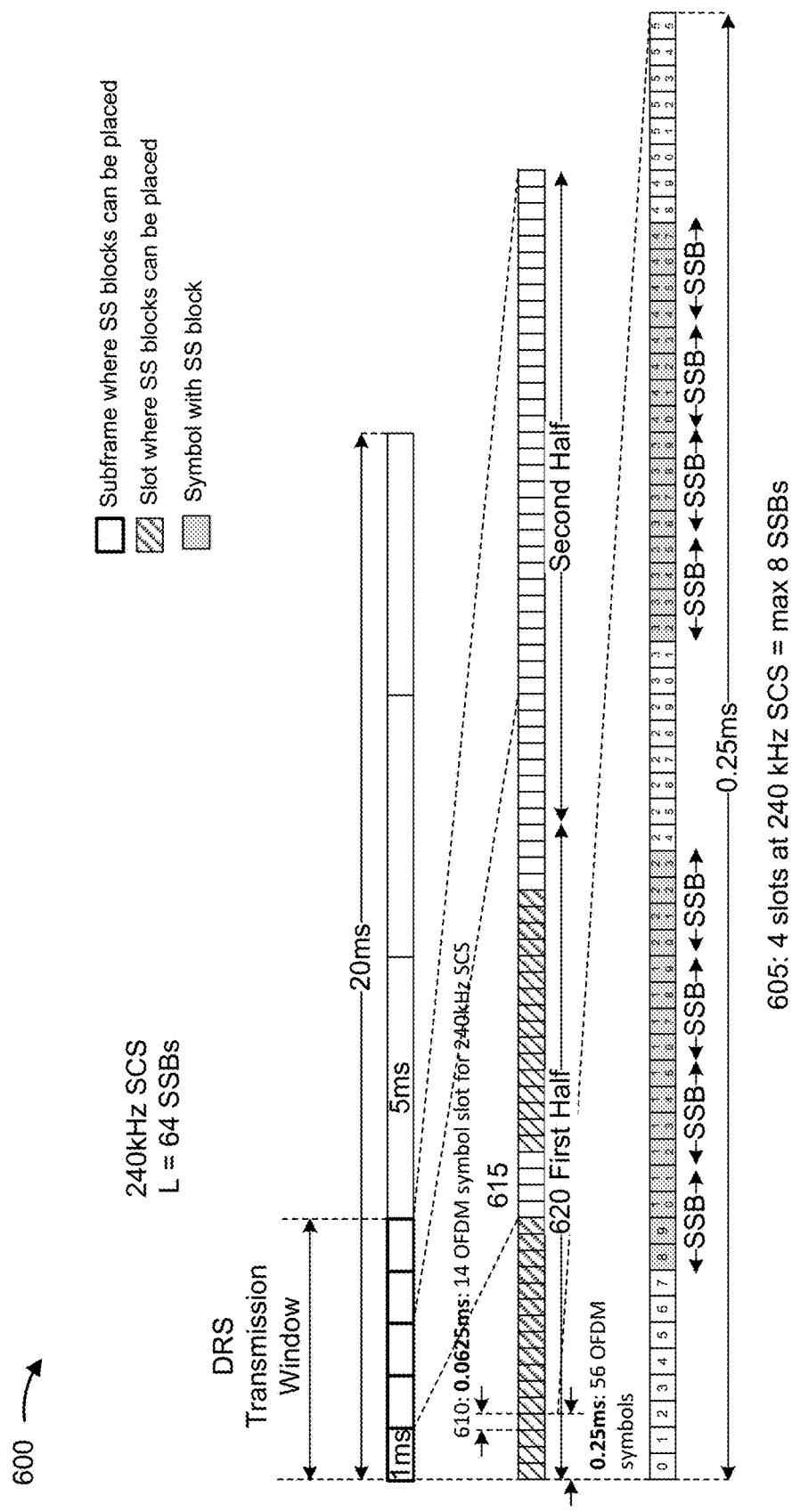
FIG. 6 is a diagram illustrating an example of SSB positions in a licensed radio frequency spectrum band with a 240 kHz sub-carrier spacing, in accordance with various aspects of the present disclosure.

FIG. 6 is a diagram illustrating an example 600 of SSB positions in a licensed radio frequency spectrum band with a 240 kHz sub-carrier spacing, in accordance with various aspects of the present disclosure.

As shown by reference number 605, in a configuration that includes 14 OFDM symbols per slot for an SCS of 240 kHz on a licensed band, a maximum of 8 SSBs may be transmitted across four consecutive slots. As shown by reference number 610, a slot may have a duration of 0.0625 milliseconds for an SCS of 240 kHz. As shown by reference number 615, a DRS transmission window having a duration of 5 milliseconds on a band with an SCS of 240 kHz may be configured with a four slot gap (e.g., having a length of 0.25 milliseconds) after the first 16 slots (e.g., 1 millisecond) that include SSBs. Furthermore, as shown by reference number 620, SSBs may only occupy the first half (e.g., the first 2.25 milliseconds) of the DRS transmission window for an SCS of 240 kHz. Thus, the DRS transmission window may include a maximum of 64 SSBs. With this configuration, SSB positions for a 240 kHz SCS may be time-aligned (at least in the first half of the DRS transmission window for 240 kHz) with SSB positions for a 120 kHz SCS.

As indicated above, this configuration does not leave room for additional candidate SSB positions for an unlicensed band (at least in the first half of the DRS transmission window) according to existing SSB patterns, such as the pattern shown in FIG. 6. Some techniques and apparatuses described herein permit additional candidate SSB positions to be added for a 240 kHz unlicensed band by introducing a new design or pattern for SSB candidate positions. Furthermore, some techniques and apparatuses described herein introduce various indexing schemes for indexing (e.g., assigning an SSB index to) the additional candidate SSB positions, and for processing SSBs based at least in part on an indexing scheme.

As indicated above, FIG. 6 is provided as an example. Other examples may differ from what is described with regard to FIG. 6.

Figure 7:
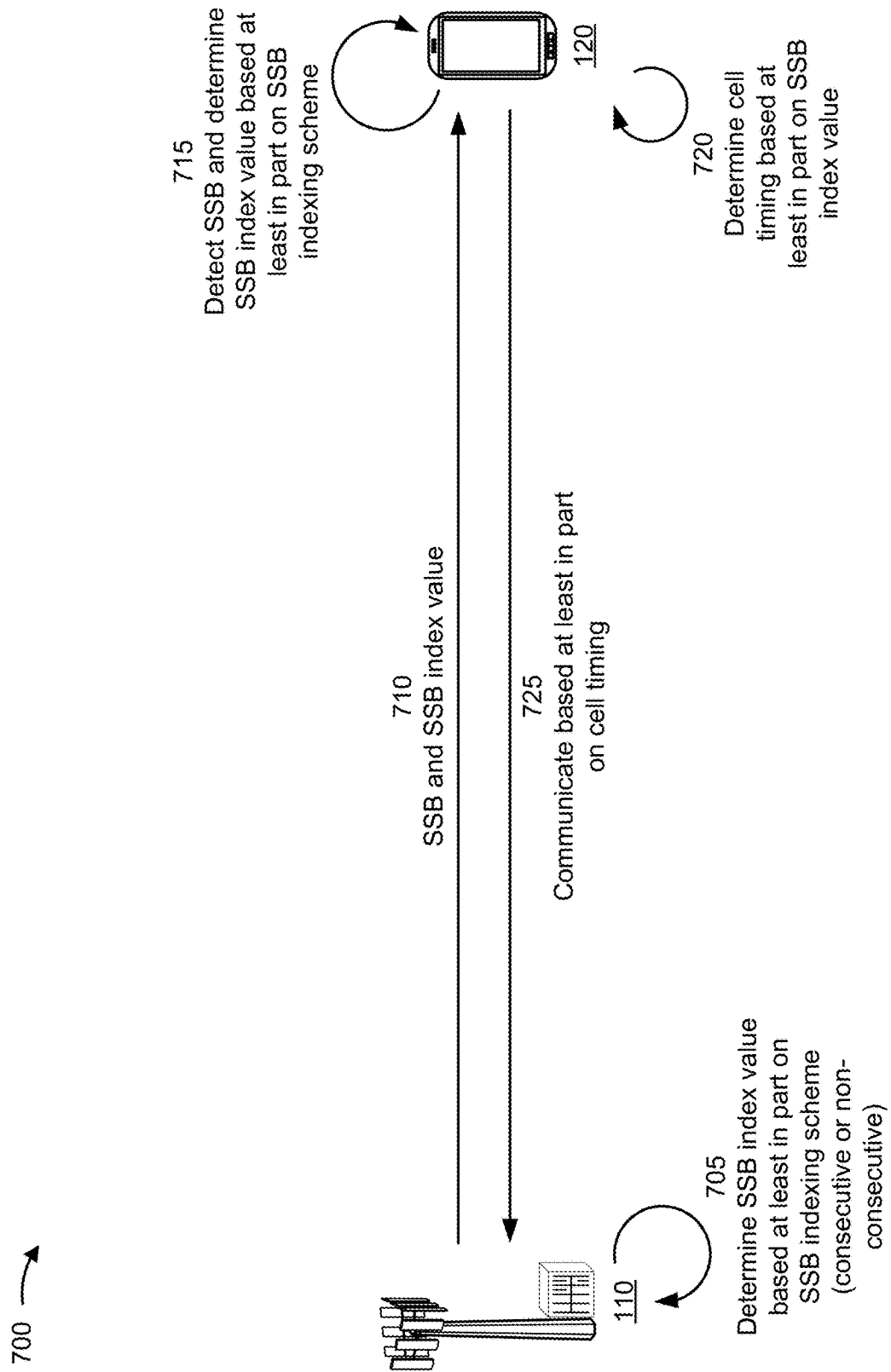
FIGS. 7-11 are diagrams illustrating examples of synchronization signal block indexing schemes, in accordance with various aspects of the present disclosure.

FIG. 7 is a diagram illustrating an example 700 of SSB indexing schemes, in accordance with various aspects of the present disclosure. As shown in FIG. 7, a base station 110 and a UE 120 may communicate with one another.

As shown by reference number 705, the base station 110 may determine an SSB index value for an SSB (or a set of SSB index values corresponding to a set of SSBs) based at least in part on an SSB indexing scheme. The SSB may be included in a DRS transmission window. In some aspects, the DRS transmission window may include more than 64 candidate SSB positions. Additionally, or alternatively, the DRS transmission window may have a duration of 5 milliseconds. In some aspects, the base station 110 may determine the SSB index value for SSB transmission on an unlicensed band.

In some aspects, the SSB indexing scheme is a scheme in which a first subset of SSBs, of a set of SSBs included in the DRS transmission window, are indexed in ascending order from earlier positions in the DRS transmission window to later positions in the DRS transmission window, and a second subset of SSBs, of the set of SSBs included in the DRS transmission window, are indexed in ascending order from earlier positions in the DRS transmission window to later positions in the DRS transmission window, and an earliest SSB included in the second subset of SSBs occurs prior to at least one SSB in the first subset of SSBs and has a higher index value than all SSBs in the first subset of SSBs. This is referred to herein as a "non-consecutive indexing scheme," and is described in more detail below in connection with FIG. 8.

In some aspects, the SSB indexing scheme is a scheme in which all SSBs, included in a DRS transmission window, are indexed consecutively in ascending order from earlier positions in the DRS transmission window to later positions in the DRS transmission window. This is referred to herein as a "consecutive indexing scheme," and is described in more detail below in connection with FIG. 9.

As shown by reference number 710, the base station 110 may transmit the SSB (e.g., in an unlicensed band), which may include an indication of the SSB index value determined by the base station 110 according to the indexing scheme (e.g., the consecutive indexing scheme or the non-consecutive indexing scheme). The base station 110 may transmit the SSB in a candidate SSB position of the DRS transmission window (e.g., one out of more than 64 candidate SSB positions of the DRS transmission window). In some aspects, the SSB index value may be indicated based at least in part on a PBCH demodulation reference signal (DMRS) sequence index, an SCS of a band on which the SSB is transmitted, a PBCH payload, and/or the like. In some aspects, the base station 110 may transmit SSBs in all candidate SSB positions. In some aspects, the base station 110 may transmit SSBs in fewer than all candidate SSB positions, such as when fewer than all candidates SSB positions are configured or used by the base station 110 for actual SSB transmissions, when the base station 110 is unable to gain access to a channel of the unlicensed band for a portion of the DRS transmission window, and/or the like.

As shown by reference number 715, the UE 120 may detect an SSB within the DRS transmission window on the unlicensed band, and may determine an SSB index value of the SSB based at least in part on an SSB indexing scheme. As described above, the DRS transmission window may include more than 64 candidate SSB positions, and the UE 120 may search (e.g., monitor) the candidate SSB positions within the DRS transmission window to obtain the SSB. As described above, the indexing scheme may be a consecutive indexing scheme or a non-consecutive indexing scheme. In some aspects, a wireless communication standard may specify whether to use the consecutive indexing scheme or the non-consecutive indexing scheme.

As shown by reference number 720, the UE 120 may determine a cell timing based at least in part on the SSB index value. For example, an SSB with a specific index value may be positioned (e.g., located in the time domain) in a specific candidate SSB position that is fixed according to a wireless communication standard. After determining the SSB index value, the UE 120 may identify a known position at which an SSB with that index value is to be positioned, and may adjust cell timing accordingly (e.g., by adjusting a timing of a slot boundary, a timing of a symbol boundary, and/or the like).

As shown by reference number 725, the UE 120 and the base station 110 may communicate based at least in part on the cell timing. For example, the UE 120 may use the determined cell timing to synchronize communications with the base station 110 (e.g., to transmit uplink communications in appropriate slot(s) and/or symbol(s) that are time-aligned with the base station 110, to receive downlink communications in appropriate slot(s) and/or symbol(s) that are time-aligned with the base station 110, and/or the like).

Using more than 64 candidate SSB positions in a DRS transmission window on an unlicensed band may enable the base station 110 to transmit SSBs in the DRS transmission window (e.g., in a later portion of the window) even if the base station 110 is unable to access the unlicensed band (e.g., in an earlier portion of the window) due to collisions and/or contention on the unlicensed band. This may reduce latency as compared to waiting for the next DRS transmission window to attempt SSB transmission. Furthermore, this may improve reliability by enabling the UE 120 to combine (e.g., for decoding purposes) multiple SSBs within the same DRS transmission window.

As indicated above, FIG. 7 is provided as an example. Other examples may differ from what is described with regard to FIG. 7.

Figure 8:
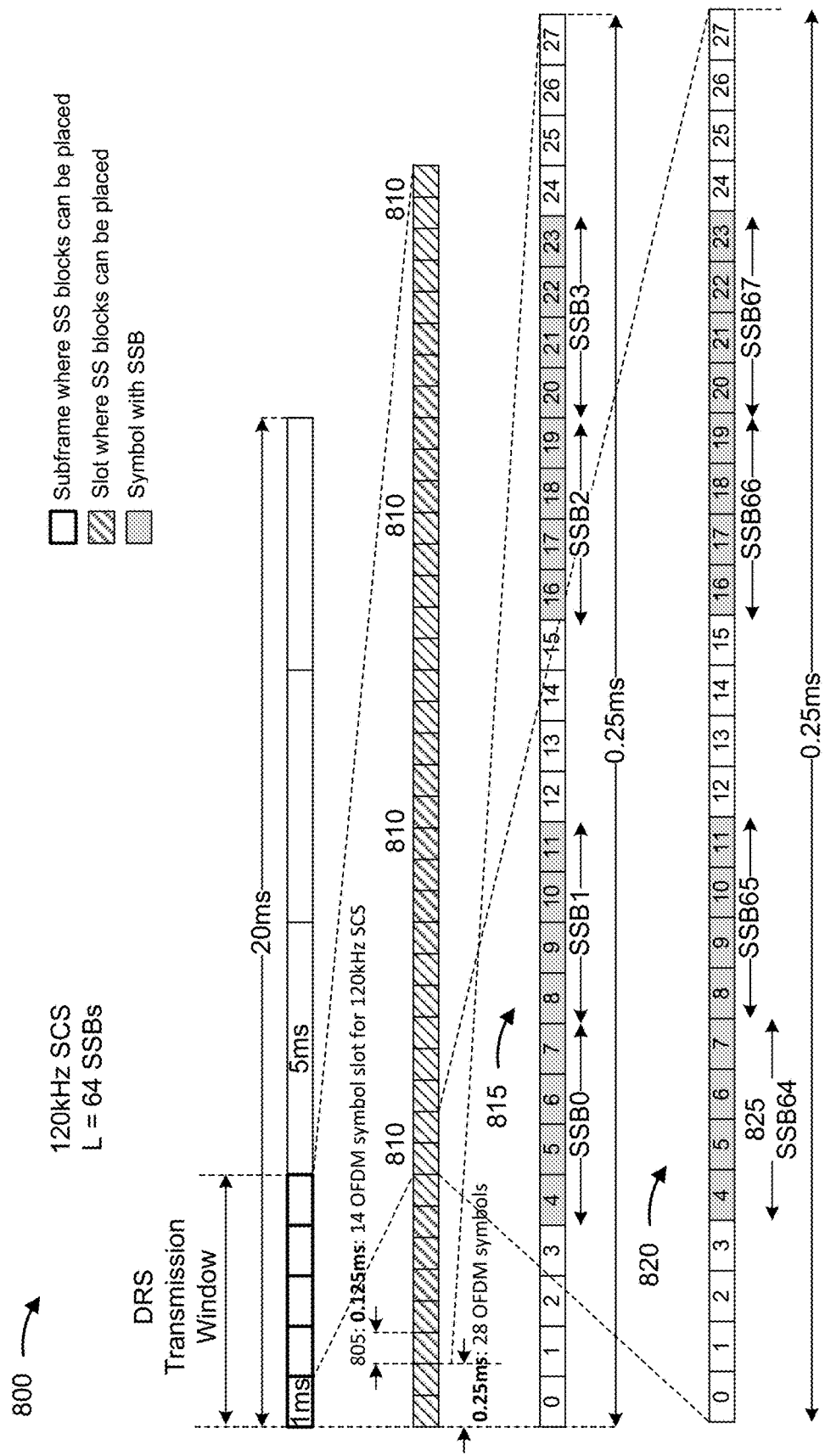

FIG. 8 is a diagram illustrating an example 800 of an SSB indexing scheme, in accordance with various aspects of the present disclosure. FIG. 8 shows example candidate SSB positions, in an unlicensed radio frequency spectrum band with a 120 kHz SCS, and corresponding SSB index values.

As described above in connection with FIG. 5, in a configuration that includes 14 OFDM symbols per slot for an SCS of 120 kHz on a licensed band, a maximum of 4 SSBs may be transmitted across two consecutive slots. As shown by reference number 805, a slot may have a duration of 0.125 milliseconds for an SCS of 120 kHz. As shown by reference number 810, a DRS transmission window having a duration of 5 milliseconds on a band with an SCS of 120 kHz may be configured without a two slot gap after every 8 slots that include SSBs. For example, four candidate SSB positions may be included in a ninth and tenth slot (e.g., between 1 millisecond and 1.25 milliseconds) in the DRS transmission window, in a nineteenth and twentieth slot (e.g., between 2.25 milliseconds and 2.50 milliseconds) in the DRS transmission window, in a twenty-ninth and thirtieth slot (e.g., between 3.5 milliseconds and 3.75 milliseconds) in the DRS transmission window, and/or in a thirty-ninth and fortieth slot (e.g., between 4.75 milliseconds and 5 milliseconds) in the DRS transmission window.

In some aspects, the DRS transmission window may include at least one candidate SSB position in every slot in the DRS transmission window. Additionally, or alternatively, the DRS transmission window may include a set of candidate SSBs positions (e.g., up to four candidate SSB positions) in every 0.25 millisecond time period (e.g. every two slots) of the DRS transmission window. With this candidate SSB pattern, the DRS transmission window may include up to 80 candidate SSB positions (e.g., 64 candidate SSB positions also included in the licensed band plus 16 additional candidate SSB positions in the four two-slot gaps used in the licensed band). In this way, additional candidate SSB positions may be added for a 120 kHz unlicensed band by introducing a new design or pattern for SSB candidate positions. Using additional candidate SSB positions in a DRS transmission window on an unlicensed band may enable the base station 110 to transmit SSBs in the DRS transmission window (e.g., in a later portion of the window) even if the base station 110 is unable to access the unlicensed band (e.g., in an earlier portion of the window) due to collisions and/or contention on the unlicensed band. This may reduce latency as compared to waiting for the next DRS transmission window to attempt SSB transmission. Furthermore, this may improve reliability by enabling the UE 120 to combine (e.g., for decoding purposes) multiple SSBs within the same DRS transmission window.

As shown in FIG. 8, in some aspects, SSBs may be indexed according to a non-consecutive indexing scheme. In this scheme, a first subset of SSBs (a portion of which is shown by reference number 815), of a set of SSBs included in the DRS transmission window, are indexed in ascending order from earlier positions in the DRS transmission window to later positions the DRS transmission window. Also, a second subset of SSBs (a portion of which is shown by reference number 820), of the set of SSBs included in the DRS transmission window, are indexed in ascending order from earlier positions in the DRS transmission window to later positions in the DRS transmission window. Also, an earliest SSB 825 included in the second subset of SSBs occurs prior to at least one SSB in the first subset of SSBs and has a higher index value than all SSBs in the first subset of SSBs (e.g., shown as an index value of 64).

In example 800, the first subset of SSBs occurs in the first through eighth slots (e.g., between 0 milliseconds and 1 millisecond) of the DRS transmission window, in the eleventh through eighteenth slots (e.g., between 1.25 milliseconds and 2.25 milliseconds) of the DRS transmission window, in the twenty-first through twenty-eighth slots (e.g., between 2.5 milliseconds and 3.5 milliseconds) of the DRS transmission window, and in the thirty-first through thirty-eighth slots (e.g., between 3.75 milliseconds and 4.75 milliseconds) of the DRS transmission window. The SSBs in the first subset of SSBs are indexed from 0 through 63 (for a total of 64 SSBs) in an order in which those SSBs occur in the time domain within the DRS transmission window.

Also in example 800, the second subset of SSBs occurs in the ninth and tenth slots (e.g., between 1 millisecond and 1.25 milliseconds) of the DRS transmission window, in the nineteenth and twentieth slots (e.g., between 2.25 milliseconds and 2.50 milliseconds) of the DRS transmission window, in the twenty-ninth and thirtieth slots (e.g., between 3.5 milliseconds and 3.75 milliseconds) of the DRS transmission window, and in the thirty-ninth and fortieth slots (e.g., between 4.75 milliseconds and 5 milliseconds) of the DRS transmission window. The SSBs in the second subset of SSBs are indexed from 64 through 79 (for a total of 16 SSBs) in an order in which those SSBs occur in the time domain within the DRS transmission window. This results in the entire set of SSBs, included in the DRS transmission window, being indexed non-consecutively from the beginning of the DRS transmission window to the end of the DRS transmission window. For example, the first 16 SSBs would be indexed from 0-15, the next 4 SSBs would be indexed from 64-67, the next 16 SSBs would be indexed from 16-31, the next 4 SSBs would be indexed from 68-71, the next 16 SSBs would be indexed from 32-47, the next 4 SSBs would be indexed from 72-75, the next 16 SSBs would be indexed from 48-63, and the last 4 SSBs would be indexed from 76-79.

This non-consecutive indexing scheme enables backward compatibility, with a legacy SSB indexing scheme being reused for SSB indexes 0 through 63. In this way, cell timing determinations can be performed by legacy UEs without introducing additional complexity.

As indicated above, FIG. 8 is provided as an example. Other examples may differ from what is described with regard to FIG. 8.

Figure 9:
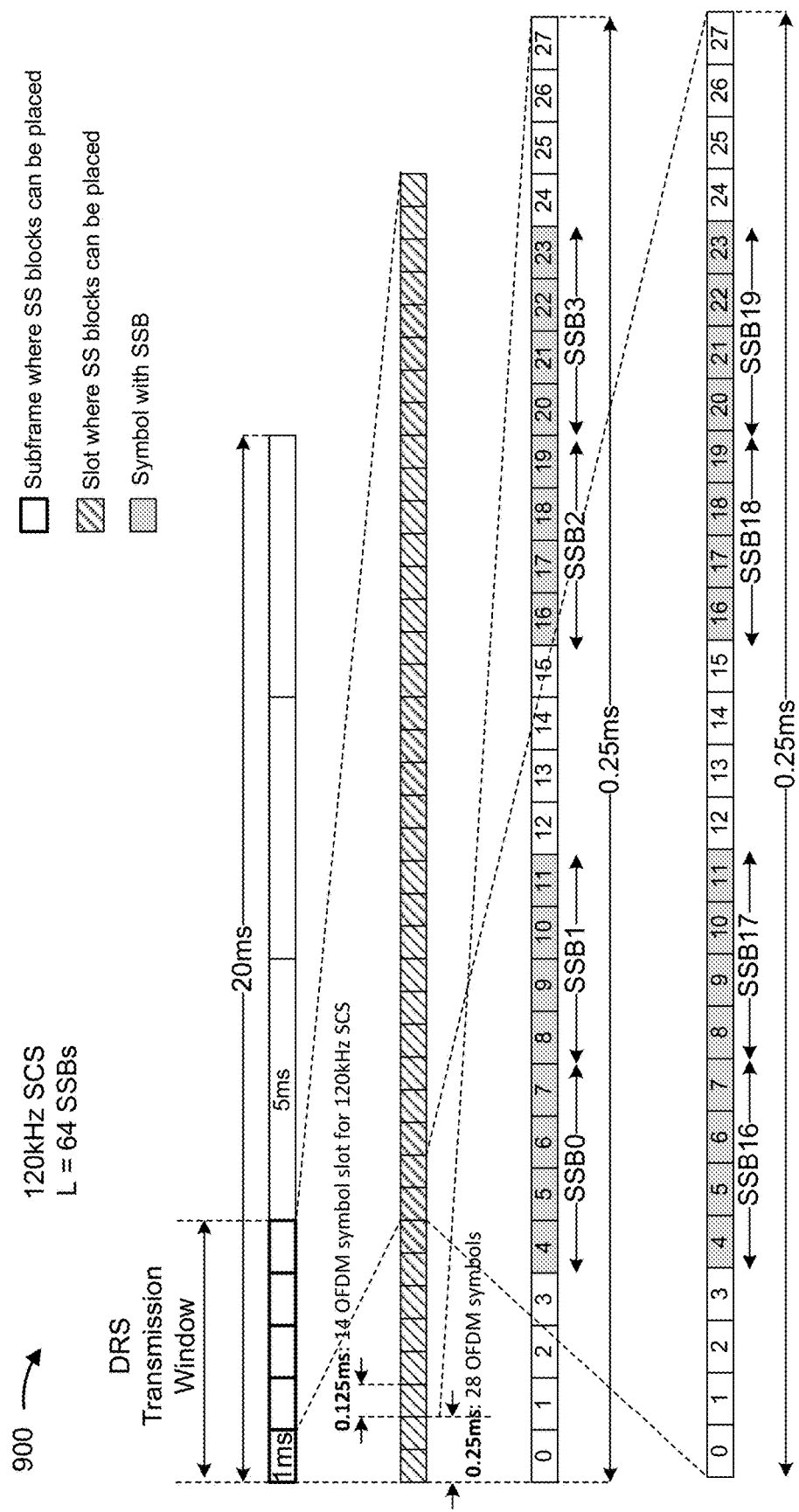

FIG. 9 is a diagram illustrating an example 900 of an SSB indexing scheme, in accordance with various aspects of the present disclosure. FIG. 9 shows the same example candidate SSB positions described above in connection with FIG. 8. In FIG. 9, a consecutive indexing scheme is shown.

As shown in FIG. 9, in some aspects, SSBs may be indexed according to a consecutive indexing scheme. In this scheme, all SSBs included in the DRS transmission window are indexed consecutively in ascending order from earlier positions in the DRS transmission window to later positions in the DRS transmission window. For example, for 80 candidate SSB positions, the 80 SSBs would be indexed from 0-79 in ascending order from a start of the DRS transmission window to an end of the DRS transmission window. This consecutive indexing scheme enables a UE 120 to perform PBCH combining across different candidate SSB positions with reduced complexity as compared to a non-consecutive indexing scheme, thereby conserving UE resources (e.g., processing resources, memory resources, and/or the like).

As indicated above, FIG. 9 is provided as an example. Other examples may differ from what is described with regard to FIG. 9.

Figure 10:
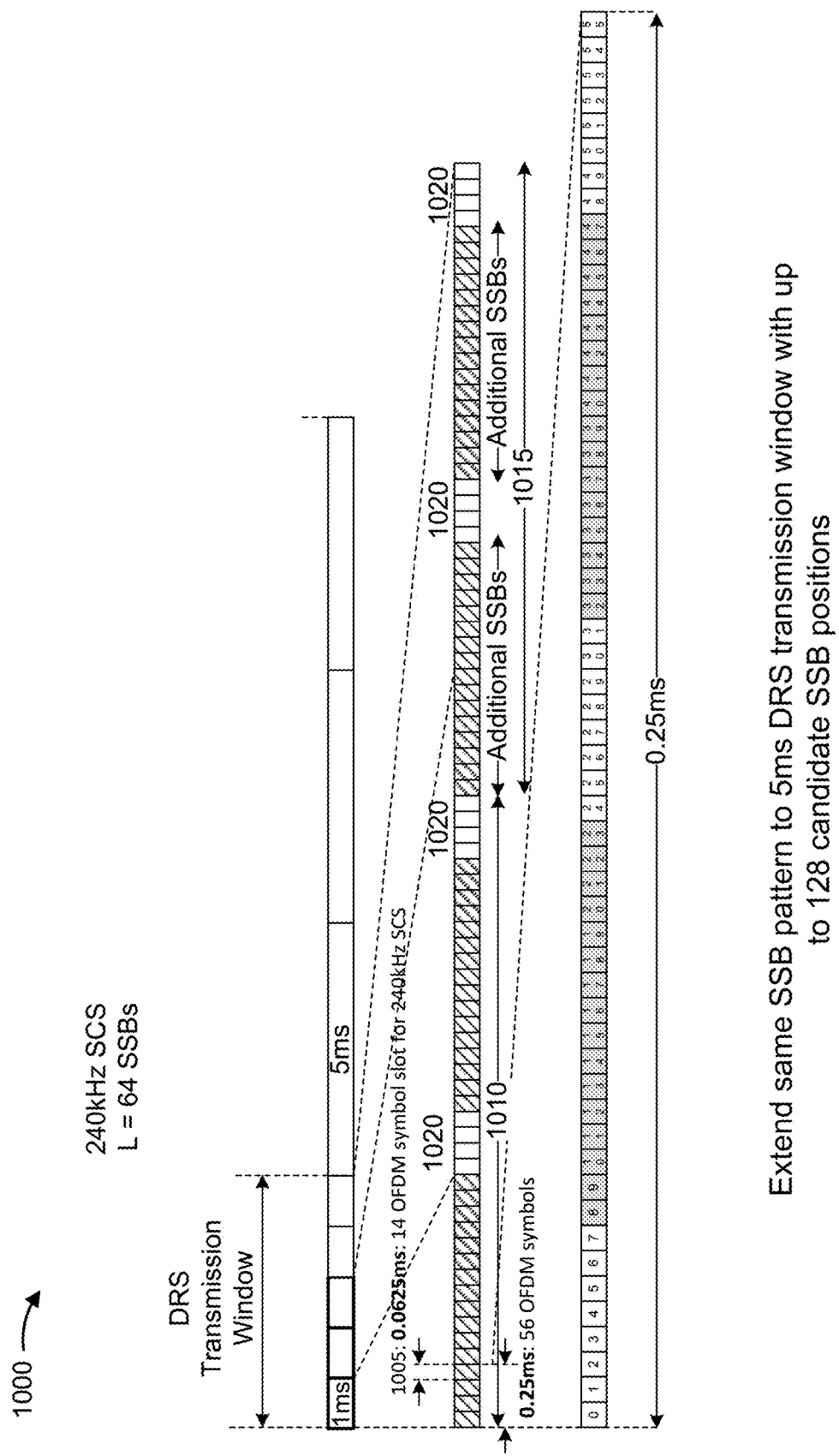

FIG. 10 is a diagram illustrating an example 1000 of an SSB indexing scheme, in accordance with various aspects of the present disclosure. FIG. 10 shows example candidate SSB positions in an unlicensed radio frequency spectrum band with a 240 kHz SCS.

As described above in connection with FIG. 6, in a configuration that includes 14 OFDM symbols per slot for an SCS of 240 kHz on a licensed band, a maximum of 8 SSBs may be transmitted across four consecutive slots. As shown by reference number 1005, a slot may have a duration of 0.0625 milliseconds for an SCS of 240 kHz. As shown, a DRS transmission window for an unlicensed band may include a first half 1010 of the window that carries SSBs (e.g., up to 64 SSBs from 0 milliseconds to 2.25 milliseconds of the window) and a second half 1015 of the window that also carries SSBs (e.g., up to 64 SSBs from 2.25 milliseconds to 5 milliseconds of the window). With this configuration, the DRS transmission window may have up to 128 candidate SSB positions.

As shown by reference number 1020, in some aspects, the DRS transmission window may include a four slot gap (e.g., having a length of 0.25 milliseconds) after every 16 slots (e.g., 1 millisecond) that include SSBs. For example, the DRS transmission window may not include candidate SSB positions (e.g., may include a gap in candidate SSB positions) in the seventeenth through twentieth slot (e.g., between 1 millisecond and 1.25 milliseconds), in the thirty-seventh through fortieth slots (e.g., between 2.25 milliseconds and 2.50 milliseconds), in the fifty-seventh through sixtieth slots (e.g., between 3.5 milliseconds and 3.75 milliseconds), and/or in the seventy-seventh through eightieth slots (e.g., between 4.75 milliseconds and 5 milliseconds).

In some aspects, SSBs may be indexed according to a consecutive indexing scheme. In this scheme, all SSBs included in the DRS transmission window are indexed consecutively in ascending order from earlier positions in the DRS transmission window to later positions in the DRS transmission window. For example, for 128 candidate SSB positions, the 128 SSBs would be indexed from 0-127 in ascending order from a start of the DRS transmission window toward an end of the DRS transmission window. This consecutive indexing scheme enables a UE 120 to perform PBCH combining across different candidate SSB positions with reduced complexity as compared to a non-consecutive indexing scheme, thereby conserving UE resources (e.g., processing resources, memory resources, and/or the like). Furthermore, this indexing scheme enables backward compatibility, with a legacy SSB indexing scheme being reused for SSB indexes 0 through 63. In this way, cell timing determinations can be performed by legacy UEs without introducing additional complexity.

As indicated above, FIG. 10 is provided as an example. Other examples may differ from what is described with regard to FIG. 10.

Figure 11:
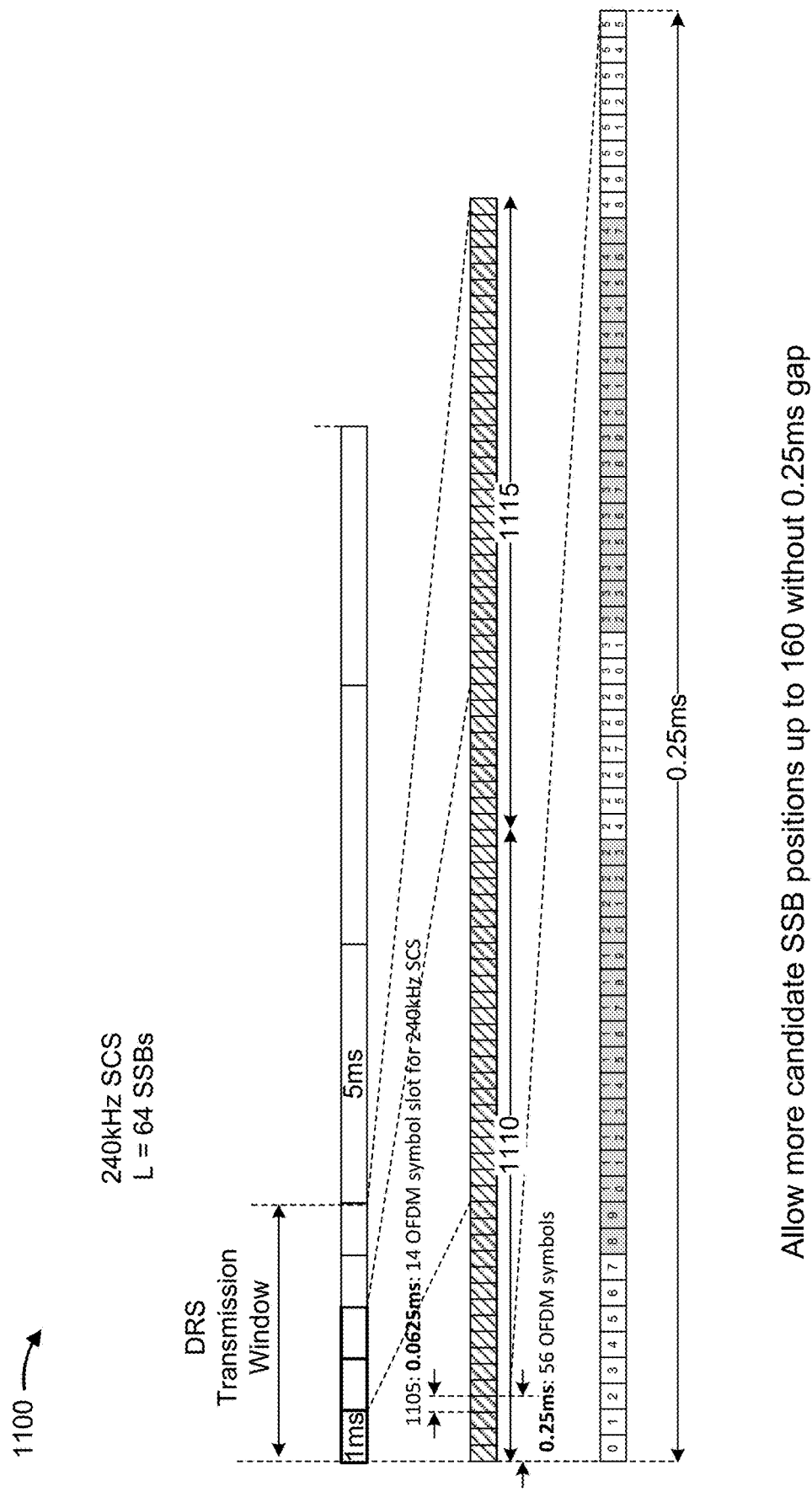

FIG. 11 is a diagram illustrating an example 1100 of an SSB indexing scheme, in accordance with various aspects of the present disclosure. FIG. 11 shows example candidate SSB positions in an unlicensed radio frequency spectrum band with a 240 kHz SCS.

As described above in connection with FIG. 6, in a configuration that includes 14 OFDM symbols per slot for an SCS of 240 kHz on a licensed band, a maximum of 8 SSBs may be transmitted across four consecutive slots. As shown by reference number 1105, a slot may have a duration of 0.0625 milliseconds for an SCS of 240 kHz. As shown, a DRS transmission window for an unlicensed band may include a first half 1110 of the window that carries SSBs (e.g., up to 64 SSBs from 0 milliseconds to 2.25 milliseconds of the window) and a second half 1115 of the window that also carries SSBs (e.g., up to 64 SSBs from 2.25 milliseconds to 5 milliseconds of the window), as described above in connection with FIG. 10.

Additionally, or alternatively, a DRS transmission window having a duration of 5 milliseconds on a band with an SCS of 240 kHz may be configured without a four slot gap (e.g., having a length of 0.25 milliseconds) after every 16 slots (e.g., 1 millisecond) that include SSBs. For example, eight candidate SSB positions may be included in a seventeenth through twentieth slot (e.g., between 1 millisecond and 1.25 milliseconds) in the DRS transmission window, in a thirty-seventh through fortieth slot (e.g., between 2.25 milliseconds and 2.50 milliseconds) in the DRS transmission window, in a fifty-seventh through sixtieth slot (e.g., between 3.5 milliseconds and 3.75 milliseconds) in the DRS transmission window, and/or in a seventy-seventh through eightieth slot (e.g., between 4.75 milliseconds and 5 milliseconds) in the DRS transmission window.

In some aspects, the DRS transmission window may include at least one candidate SSB position in every slot in the DRS transmission window. Additionally, or alternatively, the DRS transmission window may include a set of candidate SSBs positions (e.g., up to eight candidate SSB positions) in every 0.25 millisecond time period (e.g. every four slots) of the DRS transmission window. With this candidate SSB pattern, the DRS transmission window may include up to 160 candidate SSB positions (e.g., 64 candidate SSB positions also included in the licensed band plus 96 additional candidate SSB positions in the second half of the window plus the four four-slot gaps used in the licensed band). In this way, additional candidate SSB positions may be added for a 240 kHz unlicensed band by introducing a new design or pattern for SSB candidate positions. Using additional candidate SSB positions in a DRS transmission window on an unlicensed band may enable the base station 110 to transmit SSBs in the DRS transmission window (e.g., in a later portion of the window) even if the base station 110 is unable to access the unlicensed band (e.g., in an earlier portion of the window) due to collisions and/or contention on the unlicensed band. This may reduce latency as compared to waiting for the next DRS transmission window to attempt SSB transmission. Furthermore, this may improve reliability by enabling the UE 120 to combine (e.g., for decoding purposes) multiple SSBs within the same DRS transmission window.

In some aspects, the SSBs in the DRS transmission window may be indexed according to a consecutive indexing scheme. In this scheme, all SSBs included in the DRS transmission window are indexed consecutively in ascending order from earlier positions in the DRS transmission window to later positions in the DRS transmission window. For example, for 160 candidate SSB positions, the 160 SSBs would be indexed from 0-159 in ascending order from a start of the DRS transmission window to an end of the DRS transmission window. This consecutive indexing scheme enables a UE 120 to perform PBCH combining across different candidate SSB positions with reduced complexity as compared to a non-consecutive indexing scheme, thereby conserving UE resources (e.g., processing resources, memory resources, and/or the like). Furthermore, this indexing scheme enables backward compatibility, with a legacy SSB indexing scheme being reused for SSB indexes 0 through 63. In this way, cell timing determinations can be performed by legacy UEs without introducing additional complexity.

In some aspects, the SSBs in the DRS transmission window may be indexed according to a non-consecutive indexing scheme. In this scheme, a first subset of SSBs, of a set of SSBs included in the DRS transmission window, are indexed in ascending order from earlier positions in the DRS transmission window to later positions the DRS transmission window. Also, a second subset of SSBs, of the set of SSBs included in the DRS transmission window, are indexed in ascending order from earlier positions in the DRS transmission window to later positions in the DRS transmission window. Also, an earliest SSB included in the second subset of SSBs occurs prior to at least one SSB in the first subset of SSBs and has a higher index value than one or more SSBs (e.g., the first 64 SSBs, the first 128 SSBs, or all SSBs) included in the first subset of SSBs. In some aspects, the earliest SSB included in the second subset of SSBs has an SSB index value of 64. In some aspects, the earliest SSB included in the second subset of SSBs has an SSB index value of 128.

In example 1100, the first subset of SSBs may occur in the first through sixteenth slots (e.g., between 0 milliseconds and 1 millisecond) of the DRS transmission window, in the twenty-first through thirty-sixth slots (e.g., between 1.25 milliseconds and 2.25 milliseconds) of the DRS transmission window, in the forty-first through fifty-sixth slots (e.g., between 2.5 milliseconds and 3.5 milliseconds) of the DRS transmission window, and in the sixty-first through seventy-sixth slots (e.g., between 3.75 milliseconds and 4.75 milliseconds) of the DRS transmission window. The SSBs in the first subset of SSBs are indexed from 0 through 127 (for a total of 128 SSBs) in an order in which those SSBs occur in the time domain within the DRS transmission window.

Also in example 1100, the second subset of SSBs occurs in the seventeenth through twentieth slots (e.g., between 1 millisecond and 1.25 milliseconds) of the DRS transmission window, in the thirty-seventh through fortieth slots (e.g., between 2.25 milliseconds and 2.50 milliseconds) of the DRS transmission window, in the fifty-seventh through sixtieth slots (e.g., between 3.5 milliseconds and 3.75 milliseconds) of the DRS transmission window, and in the seventy-seventh through eightieth slots (e.g., between 4.75 milliseconds and 5 milliseconds) of the DRS transmission window. The SSBs in the second subset of SSBs are indexed from 128 through 159 (for a total of 32 SSBs) in an order in which those SSBs occur in the time domain within the DRS transmission window. This results in the entire set of SSBs, included in the DRS transmission window, being indexed non-consecutively from the beginning of the DRS transmission window to the end of the DRS transmission window. For example, the first 32 SSBs would be indexed from 0-31, the next 8 SSBs would be indexed from 128-135, the next 32 SSBs would be indexed from 32-63, the next 8 SSBs would be indexed from 136-143, the next 32 SSBs would be indexed from 64-95, the next 8 SSBs would be indexed from 144-151, the next 32 SSBs would be indexed from 96-127, and the last 8 SSBs would be indexed from 152-159.

This non-consecutive indexing scheme enables backward compatibility, with a legacy SSB indexing scheme being reused for SSB indexes 0 through 63. In this way, cell timing determinations can be performed by legacy UEs without introducing additional complexity.

As indicated above, FIG. 11 is provided as an example. Other examples may differ from what is described with regard to FIG. 11.

Figure 12:
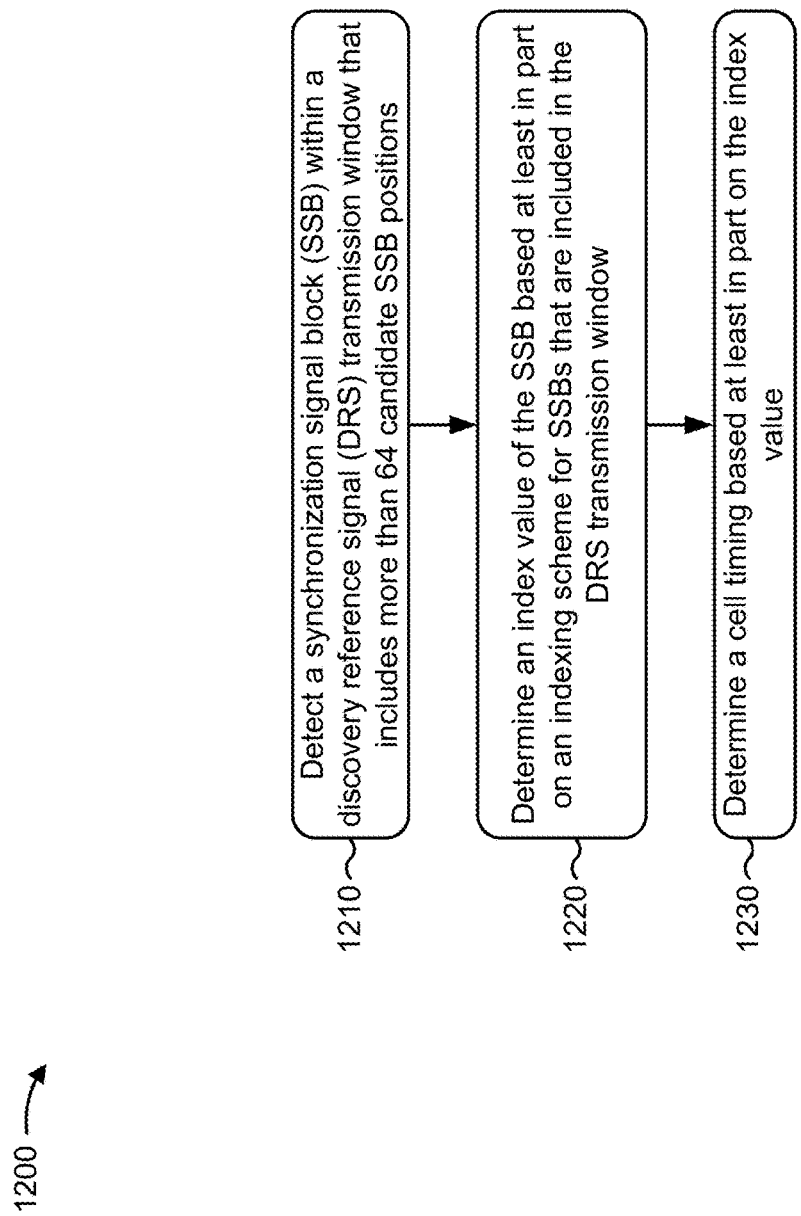
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 and/or the like) performs operations associated with SSB indexing schemes.

As shown in FIG. 12, in some aspects, process 1200 may include detecting an SSB within a DRS transmission window that includes more than 64 candidate SSB positions (block 1210). For example, the UE (e.g., using receive processor 258, controller/processor 280, memory 282, and/or the like) may detect an SSB within a DRS transmission window that includes more than 64 candidate SSB positions, as described above.

As further shown in FIG. 12, in some aspects, process 1200 may include determining an index value of the SSB based at least in part on an indexing scheme for SSBs that are included in the DRS transmission window (block 1220). For example, the UE (e.g., using receive processor 258, controller/processor 280, memory 282, and/or the like) may determine an index value of the SSB based at least in part on an indexing scheme for SSBs that are included in the DRS transmission window, as described above. In some aspects, the indexing scheme includes a consecutive indexing scheme in which all of the SSBs are indexed consecutively in ascending order from earlier positions in the DRS transmission window to later positions in the DRS transmission window. In some aspects, the indexing scheme includes a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset.

As further shown in FIG. 12, in some aspects, process 1200 may include determining a cell timing based at least in part on the index value (block 1230). For example, the UE (e.g., using receive processor 258, controller/processor 280, memory 282, and/or the like) may determine a cell timing based at least in part on the index value, as described above.

Process 1200 may include additional aspects, such as any single aspect or any combination of aspects described below and/or in connection with one or more other processes described elsewhere herein.

In a first aspect, the DRS transmission window includes a set of SSBs in every 0.25 millisecond time period of the DRS transmission window.

In a second aspect, alone or in combination with the first aspect, the SSBs are positioned within the DRS transmission window with a sub-carrier spacing of 120 kilohertz.

In a third aspect, alone or in combination with one or more of the first and second aspects, the DRS transmission window has a duration of 5 milliseconds.

In a fourth aspect, alone or in combination with one or more of the first through third aspects, the DRS transmission window includes 80 candidate SSB positions.

In a fifth aspect, alone or in combination with one or more of the first through fourth aspects, the earliest SSB included in the second subset has an index value of 64.

In a sixth aspect, alone or in combination with one or more of the first through fifth aspects, the earliest SSB included in the second subset has an index value of 128.

In a seventh aspect, alone or in combination with one or more of the first through sixth aspects, the SSBs are positioned within the DRS transmission window with a sub-carrier spacing of 240 kilohertz.

In an eighth aspect, alone or in combination with one or more of the first through seventh aspects, a portion of the SSBs are positioned in a second half of the DRS transmission window.

In a ninth aspect, alone or in combination with one or more of the first through eighth aspects, the DRS transmission window includes 128 candidate SSBs positions.

In a tenth aspect, alone or in combination with one or more of the first through ninth aspects, the DRS transmission window includes 160 candidate SSBs positions.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
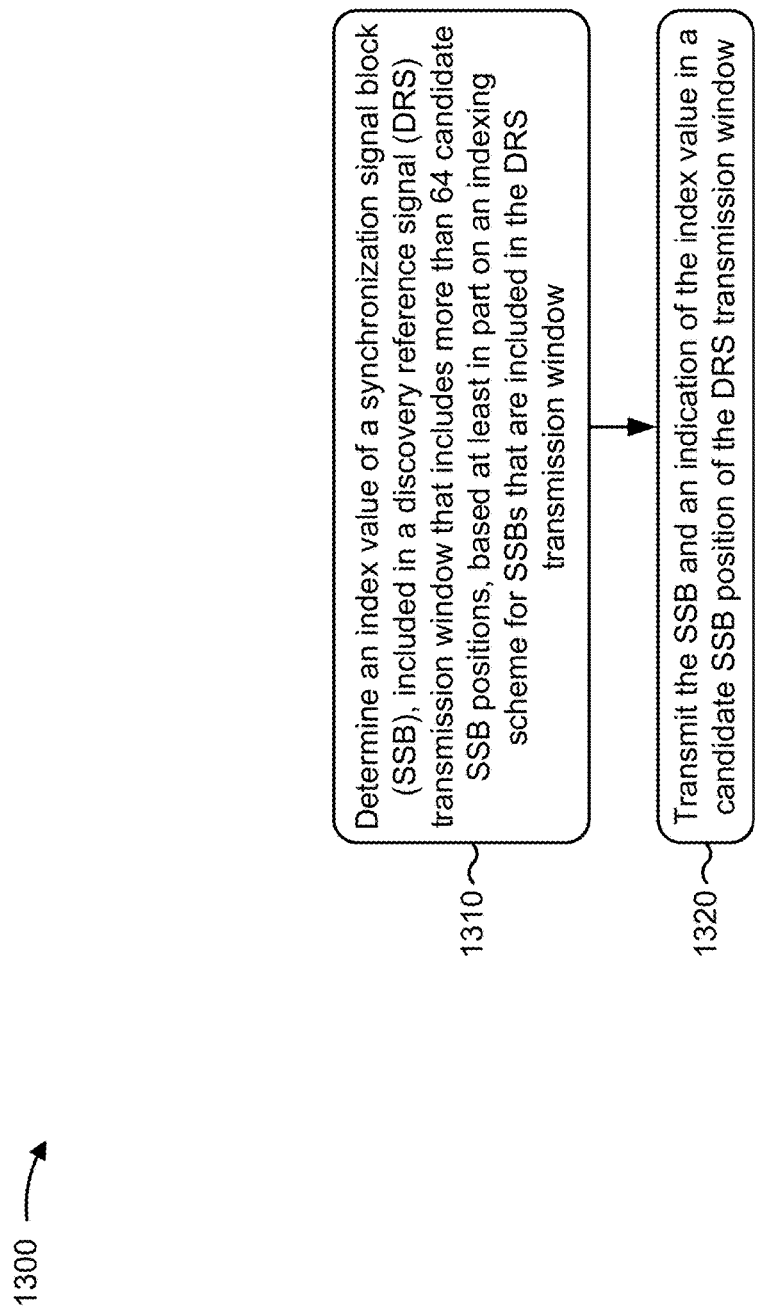
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., base station 110 and/or the like) performs operations associated with SSB indexing schemes.

As shown in FIG. 13, in some aspects, process 1300 may include determining an index value of an SSB, included in a DRS transmission window that includes more than 64 candidate SSB positions, based at least in part on an indexing scheme for SSBs that are included in the DRS transmission window (block 1310). For example, the base station (e.g., using receive processor 238, controller/processor 240, memory 242, and/or the like) may determine an index value of an SSB, included in a DRS transmission window that includes more than 64 candidate SSB positions, based at least in part on an indexing scheme for SSBs that are included in the DRS transmission window, as described above. In some aspects, the indexing scheme is a consecutive indexing scheme in which all of the SSBs are indexed consecutively in ascending order from earlier positions in the DRS transmission window to later positions in the DRS transmission window. In some aspects, the indexing scheme is a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset.

As further shown in FIG. 13, in some aspects, process 1300 may include transmitting the SSB and an indication of the index value in a candidate SSB position of the DRS transmission window (block 1320). For example, the base station (e.g., using transmit processor 220, controller/processor 240, memory 242, and/or the like) may transmit the SSB and an indication of the index value in a candidate SSB position of the DRS transmission window, as described above.

Process 1300 may include additional aspects, such as any single aspect or any combination of aspects described below and/or in connection with one or more other processes described elsewhere herein.

In a first aspect, the DRS transmission window includes a set of SSBs in every 0.25 millisecond time period of the DRS transmission window.

In a second aspect, alone or in combination with the first aspect, the SSBs are positioned within the DRS transmission window with a sub-carrier spacing of 120 kilohertz.

In a third aspect, alone or in combination with one or more of the first and second aspects, the DRS transmission window has a duration of 5 milliseconds.

In a fourth aspect, alone or in combination with one or more of the first through third aspects, the DRS transmission window includes 80 candidate SSB positions.

In a fifth aspect, alone or in combination with one or more of the first through fourth aspects, the earliest SSB included in the second subset has an index value of 64.

In a sixth aspect, alone or in combination with one or more of the first through fifth aspects, the earliest SSB included in the second subset has an index value of 128.

In a seventh aspect, alone or in combination with one or more of the first through sixth aspects, the SSBs are positioned within the DRS transmission window with a sub-carrier spacing of 240 kilohertz.

In an eighth aspect, alone or in combination with one or more of the first through seventh aspects, a portion of the SSBs are positioned in a second half of the DRS transmission window.

In a ninth aspect, alone or in combination with one or more of the first through eighth aspects, the DRS transmission window includes 128 candidate SSBs positions.

In a tenth aspect, alone or in combination with one or more of the first through ninth aspects, the DRS transmission window includes 160 candidate SSBs positions.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The following provides an overview of some aspects of the present disclosure:

Aspect 1: A method of wireless communication performed by a user equipment (UE), comprising: detecting a synchronization signal block (SSB) within a discovery reference signal (DRS) transmission window that includes more than 64 candidate SSB positions; determining an index value of the SSB based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and determining a cell timing based at least in part on the index value.

Aspect 2: The method of aspect 1, wherein the DRS transmission window includes a set of SSBs in every 0.25 millisecond time period of the DRS transmission window.

Aspect 3: The method of any of the preceding aspects, wherein the DRS transmission window has a duration of 5 milliseconds.

Aspect 4: The method of any of the preceding aspects, wherein the SSBs are positioned within the DRS transmission window with a sub-carrier spacing of 120 kilohertz.

Aspect 5: The method of any of the preceding aspects, wherein the DRS transmission window includes 80 candidate SSB positions.

Aspect 6: The method of any of the preceding aspects, wherein the earliest SSB included in the second subset has an index value of 64.

Aspect 7: The method of any of aspects 1-5, wherein the earliest SSB included in the second subset has an index value of 128.

Aspect 8: The method of any of aspects 1-3, wherein the SSBs are positioned within the DRS transmission window with a sub-carrier spacing of 240 kilohertz.

Aspect 9: The method of aspect 8, wherein a portion of the SSBs are positioned in a second half of the DRS transmission window.

Aspect 10: The method of any of aspects 1-9, wherein the DRS transmission window includes 128 candidate SSBs positions.

Aspect 11: The method of any of aspects 1-9, wherein the DRS transmission window includes 160 candidate SSBs positions.

Aspect 12: A method of wireless communication performed by a base station, comprising: determining an index value of a synchronization signal block (SSB), included in a discovery reference signal (DRS) transmission window that includes more than 64 candidate SSB positions, based at least in part on an indexing scheme for SSBs that are included in the DRS transmission window, wherein the indexing scheme includes one of: a consecutive indexing scheme in which all of the SSBs are indexed consecutively in ascending order from earlier positions in the DRS transmission window to later positions in the DRS transmission window, or a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and transmitting the SSB and an indication of the index value in a candidate SSB position of the DRS transmission window.

Aspect 13: The method of aspect 12, wherein the DRS transmission window includes a set of SSBs in every 0.25 millisecond time period of the DRS transmission window.

Aspect 14: The method of any one of aspects 12-13, wherein the DRS transmission window has a duration of 5 milliseconds.

Aspect 15: The method of any of aspects 12-14, wherein the SSBs are positioned within the DRS transmission window with a sub-carrier spacing of 120 kilohertz.

Aspect 16: The method of any of aspects 12-15, wherein the DRS transmission window includes 80 candidate SSB positions.

Aspect 17: The method of any of aspects 12-16, wherein the earliest SSB included in the second subset has an index value of 64.

Aspect 18: The method of any of aspects 12-16, wherein the earliest SSB included in the second subset has an index value of 128.

Aspect 19: The method of any of aspects 12-14, wherein the SSBs are positioned within the DRS transmission window with a sub-carrier spacing of 240 kilohertz.

Aspect 20: The method of aspect 19, wherein a portion of the SSBs are positioned in a second half of the DRS transmission window.

Aspect 21: The method of any of aspects 12-20, wherein the DRS transmission window includes 128 candidate SSBs positions.

Aspect 22: The method of any of aspects 12-20, wherein the DRS transmission window includes 160 candidate SSBs positions.

Aspect 23: An apparatus for wireless communication at a device, comprising a processor; memory coupled with the processor; and instructions stored in the memory and executable by the processor to cause the apparatus to perform the method of one or more aspects of aspects 1-11.

Aspect 24: A device for wireless communication, comprising a memory and one or more processors coupled to the memory, the memory and the one or more processors configured to perform the method of one or more aspects of aspects 1-11.

Aspect 25: An apparatus for wireless communication, comprising at least one means for performing the method of one or more aspects of aspects 1-11.

Aspect 26: A non-transitory computer-readable medium storing code for wireless communication, the code comprising instructions executable by a processor to perform the method of one or more aspects of aspects 1-11.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-11.

Aspect 28: An apparatus for wireless communication at a device, comprising a processor; memory coupled with the processor; and instructions stored in the memory and executable by the processor to cause the apparatus to perform the method of one or more aspects of aspects 12-22.

Aspect 29: A device for wireless communication, comprising a memory and one or more processors coupled to the memory, the memory and the one or more processors configured to perform the method of one or more aspects of aspects 12-22.

Aspect 30: An apparatus for wireless communication, comprising at least one means for performing the method of one or more aspects of aspects 12-22.

Aspect 31: A non-transitory computer-readable medium storing code for wireless communication, the code comprising instructions executable by a processor to perform the method of one or more aspects of aspects 12-22.

Aspect 32: A non-transitory computer-readable medium storing a set of instructions for wireless communication, the set of instructions comprising one or more instructions that, when executed by one or more processors of a device, cause the device to perform the method of one or more aspects of aspects 12-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
a memory; and
one or more processors coupled to the memory, the one or more processors configured to:
detect a synchronization signal block (SSB) within a discovery reference signal (DRS) transmission window that includes more than 64 candidate SSB positions;
determine an index value of the SSB based at least in part on an indexing scheme for SSBs that are included in the DRS transmission window, wherein the indexing scheme comprises:
a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and
determine a cell timing based at least in part on the index value.

2. The UE of claim 1, wherein the DRS transmission window includes a set of SSBs in every 0.25 millisecond time period of the DRS transmission window.

3. The UE of claim 1, wherein the DRS transmission window has a duration of 5 milliseconds.

4. The UE of claim 1, wherein the SSBs are positioned within the DRS transmission window with a sub-carrier spacing of 120 kilohertz.

5. The UE of claim 1, wherein the DRS transmission window includes 80 candidate SSB positions.

6. The UE of claim 1, wherein the earliest SSB included in the second subset has an index value of 64.

7. The UE of claim 1, wherein the earliest SSB included in the second subset has an index value of 128.

8. The UE of claim 1, wherein the SSBs are positioned within the DRS transmission window with a sub-carrier spacing of 240 kilohertz.

9. The UE of claim 8, wherein a portion of the SSBs are positioned in a second half of the DRS transmission window.

10. The UE of claim 1, wherein the DRS transmission window includes 128 candidate SSBs positions.

11. The UE of claim 1, wherein the DRS transmission window includes 160 candidate SSBs positions.

12. A method of wireless communication performed by a user equipment (UE), comprising:
detecting a synchronization signal block (SSB) within a discovery reference signal (DRS) transmission window that includes more than 64 candidate SSB positions;
determining an index value of the SSB based at least in part on an indexing scheme for SSBs that are included in the DRS transmission window, wherein the indexing scheme comprises:
a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and
determining a cell timing based at least in part on the index value.

13. The method of claim 12, wherein the DRS transmission window includes a set of SSBs in every 0.25 millisecond time period of the DRS transmission window.

14. The method of claim 12, wherein the DRS transmission window has a duration of 5 milliseconds.

15. The method of claim 12, wherein the SSBs are positioned within the DRS transmission window with a sub-carrier spacing of 120 kilohertz or 240 kilohertz.

16. The method of claim 12, wherein the DRS transmission window includes 80 candidate SSB positions.

17. The method of claim 12, wherein the earliest SSB included in the second subset has an index value of 64.

18. The method of claim 12, wherein the earliest SSB included in the second subset has an index value of 128.

19. A non-transitory computer-readable medium storing one or more instructions for wireless communication, the one or more instructions comprising:
one or more instructions that, when executed by one or more processors of a user equipment (UE), cause the one or more processors to:
detect a synchronization signal block (SSB) within a discovery reference signal (DRS) transmission window that includes more than 64 candidate SSB positions;
determine an index value of the SSB based at least in part on an indexing scheme for SSBs that are included in the DRS transmission window, wherein the indexing scheme comprises:
a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and
determine a cell timing based at least in part on the index value.

20. The non-transitory computer-readable medium of claim 19, wherein the DRS transmission window includes a set of SSBs in every 0.25 millisecond time period of the DRS transmission window.

21. The non-transitory computer-readable medium of claim 19, wherein the DRS transmission window has a duration of 5 milliseconds.

22. The non-transitory computer-readable medium of claim 19, wherein the SSBs are positioned within the DRS transmission window with a sub-carrier spacing of 120 kilohertz.

23. The non-transitory computer-readable medium of claim 19, wherein the DRS transmission window includes 80 candidate SSB positions.

24. The non-transitory computer-readable medium of claim 19, wherein the earliest SSB included in the second subset has an index value of 64.

25. The non-transitory computer-readable medium of claim 19, wherein the earliest SSB included in the second subset has an index value of 128.

26. The non-transitory computer-readable medium of claim 19, wherein the SSBs are positioned within the DRS transmission window with a sub-carrier spacing of 240 kilohertz.

27. The non-transitory computer-readable medium of claim 26, wherein a portion of the SSBs are positioned in a second half of the DRS transmission window.

28. The non-transitory computer-readable medium of claim 19, wherein the DRS transmission window includes 128 candidate SSBs positions.

29. The non-transitory computer-readable medium of claim 19, wherein the DRS transmission window includes 160 candidate SSBs positions.

30. An apparatus for wireless communication, comprising:
means for detecting a synchronization signal block (SSB) within a discovery reference signal (DRS) transmission window that includes more than 64 candidate SSB positions;
means for determining an index value of the SSB based at least in part on an indexing scheme for SSBs that are included in the DRS transmission window, wherein the indexing scheme comprises:
a non-consecutive indexing scheme in which a first subset of the SSBs are indexed in ascending order from earlier positions in the DRS transmission window to later positions in the DRS transmission window and a second subset of the SSBs are indexed in ascending order from earlier positions in the DRS transmission window to later positions in the DRS transmission window, wherein an earliest SSB included in the second subset occurs prior to at least one SSB in the first subset and has a higher index value than all SSBs in the first subset; and
means for determining a cell timing based at least in part on the index value.

* * * * *